United States Patent
Yuma et al.

(10) Patent No.: US 11,891,014 B2
(45) Date of Patent: Feb. 6, 2024

(54) VEHICLE

(71) Applicant: TOYOTA JIDOSHA KABUSHIKI KAISHA, Toyota (JP)

(72) Inventors: Takashi Yuma, Toyokawa (JP); Atsushi Tabata, Okazaki (JP); Koichi Okuda, Toyota (JP); Atsushi Kamada, Miyoshi (JP); Kazumi Shine, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 17/164,993

(22) Filed: Feb. 2, 2021

(65) Prior Publication Data
US 2021/0245703 A1    Aug. 12, 2021

(30) Foreign Application Priority Data

Feb. 7, 2020    (JP) ................ 2020-019801

(51) Int. Cl.
    *B60R 25/06*    (2006.01)
    *B60R 25/32*    (2013.01)
    (Continued)

(52) U.S. Cl.
    CPC ............ *B60R 25/06* (2013.01); *B60R 25/20* (2013.01); *B60R 25/24* (2013.01); *B60R 25/31* (2013.01);
    (Continued)

(58) Field of Classification Search
    CPC .... B60W 60/001; B60W 10/10; B60W 40/08; B60W 2040/0809; B60W 2520/10;
    (Continued)

(56) References Cited

U.S. PATENT DOCUMENTS 9,836,892 B1    12/2017  Nishiyama et al.
9,855,917 B2 *  1/2018   Katou ............... B60R 25/24
                         (Continued)

FOREIGN PATENT DOCUMENTS

CN    105835834 A    8/2016
JP    2004-122831 A  4/2004
                    (Continued)

OTHER PUBLICATIONS

WO_2015056530_A1_Machine_Translation (Year: 2015).*
(Continued)

*Primary Examiner* — Jelani A Smith
*Assistant Examiner* — Alyssa Rorie
(74) *Attorney, Agent, or Firm* — Oliff PLC (57) ABSTRACT

A vehicle includes a controller. The controller is configured to perform authentication of a portable device by communication with the portable device when startup of a system of the vehicle is instructed, when the system is off, or when the startup of the system of the vehicle is instructed and the system is off. The controller is configured to perform the startup of the system of the vehicle when the startup of the system of the vehicle is instructed, under a condition that the authentication of the portable device is successful. The controller is configured to perform reauthentication of the portable device when predetermined movement of the vehicle is detected after the startup of the system of the vehicle, and perform theft prevention processing when the reauthentication of the portable device fails.

7 Claims, 3 Drawing Sheets

(51) Int. Cl.
  *B60W 60/00* (2020.01)
  *B60W 10/10* (2012.01)
  *B60R 25/31* (2013.01)
  *B60W 40/08* (2012.01)
  *B60R 25/24* (2013.01)
  *B60R 25/20* (2013.01)

(52) U.S. Cl.
  CPC .............. *B60R 25/32* (2013.01); *B60W 10/10* (2013.01); *B60W 40/08* (2013.01); *B60W 60/001* (2020.02); *B60W 2040/0809* (2013.01); *B60W 2520/10* (2013.01)

(58) Field of Classification Search
  CPC ......... B60R 25/06; B60R 25/20; B60R 25/24; B60R 25/31; B60R 25/32; B60R 25/33; B60R 2325/306; B60R 25/248; B60K 6/445; Y02T 10/62
  See application file for complete search history.

(56) References Cited

U.S. PATENT DOCUMENTS

| | | | | |
|---|---|---|---|---|
| 2002/0154036 | A1* | 10/2002 | Flick | B60R 25/04 340/988 |
| 2006/0206249 | A1* | 9/2006 | Fujioka | B60R 25/066 701/1 |
| 2010/0210319 | A1* | 8/2010 | Tanaka | B60R 25/10 455/572 |
| 2015/0002265 | A1* | 1/2015 | Warschat | B60R 16/02 340/5.64 |
| 2016/0225203 | A1 | 8/2016 | Asmar et al. | |
| 2017/0008488 | A1* | 1/2017 | Matsumoto | B60R 25/31 |
| 2018/0056939 | A1* | 3/2018 | van Roermund | B60R 25/04 |
| 2018/0118163 | A1 | 5/2018 | Murakami et al. | |
| 2019/0012859 | A1* | 1/2019 | Leonhardt | B60R 25/10 |
| 2021/0245706 | A1* | 8/2021 | Wada | B60R 25/102 |

FOREIGN PATENT DOCUMENTS

| | | |
|---|---|---|
| JP | 2010-007457 A | 1/2010 |
| JP | 2015-000627 A | 1/2015 |
| JP | 2017-160703 A | 9/2017 |
| JP | 2017-222299 A | 12/2017 |
| JP | 2018-021338 A | 2/2018 |
| JP | 2018-053489 A | 4/2018 |
| JP | 2018-071175 A | 5/2018 |
| WO | 2015/056530 A1 | 4/2015 |

OTHER PUBLICATIONS

Wang et al., JP2017030447A_Machine Translation (Year: 2017).*
Zhou, Xu, et al. "Chapter 7 Typical Examples of Vehicle Bus System Inspection," Vehicle Bus Technology, First Edition, pp. 165-169, 2014.
Translation of Aug. 15, 2023 Office Action issued in Chinese Patent Application No. 202110140225.7.

* cited by examiner

VEHICLE

CROSS-REFERENCE TO RELATED APPLICATION

This application claims priority to Japanese Patent Application No. 2020-019801 filed on Feb. 7, 2020, incorporated herein by reference in its entirety.

BACKGROUND

1. Technical Field

The present disclosure relates to a vehicle.

2. Description of Related Art

For this type of technology, a vehicle control system has been proposed where onboard devices installed in a vehicle are operated based on bidirectional communication between the vehicle and a portable device (e.g., see Japanese Unexamined Patent Application Publication No. 2018-71175 (JP 2018-71175 A)). In this vehicle control system, the vehicle is provided with a low frequency (LF) transmission unit that transmits a first signal of LF band radio waves over a predetermined range outside of the vehicle cabin, a radio frequency (RF) reception unit that receives a second signal and a third signal of RF band radio waves from the portable device, a detecting unit that detects the strength of radio waves of signals received by the RF reception unit, a control unit that operates an onboard device based on reception of the third signal, and a restricting unit that restricts or forbids operation of the onboard device based on the third signal when the radio wave strength of the third signal is smaller than the radio wave strength of the second signal by more than a predetermined reference. Also, the portable device is provided with an LF reception unit that receives the first signal from the vehicle, and an RF transmission unit that, when receiving the first signal, transmits the second signal to the vehicle and thereafter transmits the third signal to the vehicle. When the radio wave strength of the third signal is smaller than the radio wave strength of the second signal by more than the predetermined reference, judgment can be made that the portable device is too far away from the vehicle, and accordingly the control unit can appropriately restrict or forbid operation of the onboard device.

SUMMARY

The above-described vehicle control system is effective to a certain extent regarding a theft technique called a "relay attack", where a third party with malicious intent uses a relay device to relay signals from the vehicle to a portable device at a somewhat distant location (e.g., a portable device in the home of the user) or the like, thereby enabling door locks of the vehicle to be disengaged, startup of the system to be performed, and so forth. However, once the unauthorized authentication of the portable device by the vehicle succeeds and system startup is performed, and the vehicle starts to be driven, theft prevention processing becomes difficult thereafter.

The present disclosure provides a vehicle that enables prevention of theft in a more reliable manner.

A vehicle according to an aspect of the present disclosure includes a controller. The controller is configured to perform authentication of a portable device by communication with the portable device when startup of a system of the vehicle is instructed, when the system is off, or when startup of a system of the vehicle is instructed and the system is off. The controller is configured to perform startup of the system of the vehicle when startup of the system of the vehicle is instructed, under a condition that authentication of the portable device is successful. The controller is configured to perform reauthentication of the portable device when predetermined movement of the vehicle is detected after startup of the system of the vehicle, and perform theft prevention processing when reauthentication of the portable device fails.

In the vehicle according to the aspect of the present disclosure, authentication of a portable device is performed by communication with the portable device when startup of the system of the vehicle is instructed, and/or when the system is off (authentication prior to startup of the system of the vehicle). Startup of the system of the vehicle is performed when startup of the system of the vehicle is instructed, under a condition that authentication of the portable device is successful. Reauthentication of the portable device (authentication after startup of the system of the vehicle) is then performed when predetermined movement of the vehicle is detected after startup of the system of the vehicle, and perform theft prevention processing when reauthentication of the portable device fails. Thus, theft of the vehicle can be prevented in a more reliable manner.

In the vehicle according to the aspect of the present disclosure, the controller may be configured to determine that the predetermined movement of the vehicle is detected when the vehicle travels a predetermined distance or a vehicle speed reaches a predetermined vehicle speed or above, after startup of the system of the vehicle. In the vehicle according to the aspect of the present disclosure, the predetermined movement of the vehicle can be detected.

In the vehicle according to the aspect of the present disclosure, the controller may be configured to control, as the theft prevention processing, a drive device for driving to return to a geographical position where startup of the system of the vehicle is performed by autonomous driving when reauthentication of the portable device fails. In the vehicle according to the aspect of the present disclosure, the vehicle can return to the geographical position where startup of the system of the vehicle is performed.

In the vehicle according to the aspect of the present disclosure, the controller may be configured to restrict, as the theft prevention processing, output of the drive device when reauthentication of the portable device fails and autonomous driving is not usable. Also, in the vehicle according to the aspect of the present disclosure, the controller may be configured to change, as the theft prevention processing, a shift position to a park position when the vehicle speed is a predetermined vehicle speed or slower when reauthentication of the portable device fails and autonomous driving is not usable.

In the vehicle according to the aspect of the present disclosure, the controller may be configured to restrict, as the theft prevention processing, output of the drive device for driving when reauthentication of the portable device fails. Also, in the vehicle according to the aspect of the present disclosure, the controller may be configured to change, as the theft prevention processing, a shift position to a park position when the vehicle speed is a predetermined vehicle speed or slower when reauthentication of the portable device fails.

In the vehicle according to the aspect of the present disclosure, the controller may be configured to perform reauthentication of the portable device when the predetermined movement of the vehicle is detected after startup of the system of the vehicle at a predetermined geographical position, and not perform reauthentication of the portable device after startup of the system of the vehicle at a geographical position other than the predetermined geographical position.

In the vehicle according to the aspect of the present disclosure, the controller may be configured to perform an annunciation to bring the portable device into a proximity of a predetermined portion of the vehicle when reauthentication of the portable device fails, and is configured to change the failure in reauthentication of the portable device to success when the controller detects that the portable device is in the proximity of the predetermined portion.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment for carrying out the present disclosure will be described below by way of an example.

Figure 1:
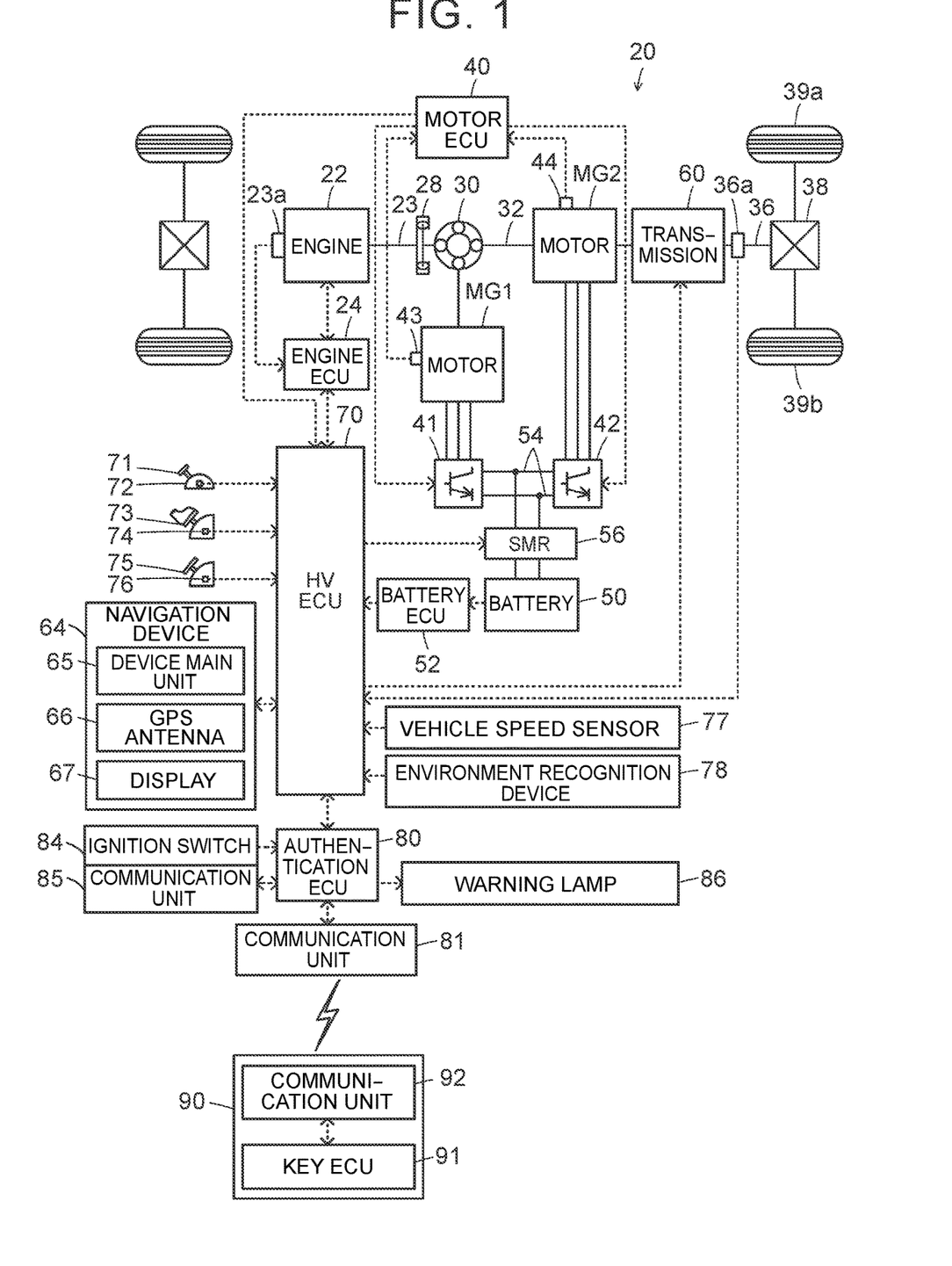
FIG. 1 is a configuration diagram illustrating an overview of a configuration of a hybrid vehicle 20 according to an embodiment of the present disclosure.

FIG. 1 is a configuration diagram illustrating an overview of a configuration of a hybrid vehicle 20 according to the embodiment of the present disclosure. The hybrid vehicle 20 according to the embodiment is provided with an engine 22, a planetary gear 30, motors MG1, MG2, inverters 41, 42, a battery 50, a system main relay (SMR) 56, a transmission 60, a navigation device 64, a hybrid vehicle electronic control unit (hereinafter referred to as HV ECU) 70, and an authentication electronic control unit (hereinafter referred to as authentication ECU) 80, as illustrated in FIG. 1.

The engine 22 is configured as an internal combustion engine that burns fuel such as gasoline or light oil to output power. A crankshaft 23 of the engine 22 is connected to a carrier of the planetary gear 30 via a damper 28. Operation of the engine 22 is controlled by an engine electronic control unit (hereinafter referred to as engine ECU) 24.

The engine ECU 24 is provided with a microcomputer including a central processing unit (CPU), read-only memory (ROM), random access memory (RAM), an input-output port, and a communication port. The engine ECU 24 receives input of signals from various types of sensors necessary for operation control of the engine 22, via the input port. An example of a signal input to the engine ECU 24 is a crankshaft angle θcr from a crank position sensor 23a that detects the rotational position of the crankshaft 23 of the engine 22. The engine ECU 24 outputs various types of control signals for operation control of the engine 22, via the output port. The engine ECU 24 is connected to the HV ECU 70 via the communication port. The engine ECU 24 computes revolutions Ne of the engine 22 based on the crankshaft angle θcr from the crank position sensor 23a.

The planetary gear 30 is configured as a single-pinion type planetary gearset configuration. A rotor of the motor MG1 is connected to a sun gear of the planetary gear 30. A rotor of the motor MG2 and an input shaft of the transmission 60 are connected to a ring gear of the planetary gear 30 via a transmitting member 32. The crankshaft 23 of the engine 22 is connected to the carrier of the planetary gear 30 via the damper 28, as described above.

The motor MG1 is configured as a synchronous generator-motor for example, with the rotor of the motor MG1 connected to the sun gear of the planetary gear as described above. The motor MG2 is configured as a synchronous generator-motor for example, with the rotor of the motor MG2 connected to the ring gear of the planetary gear 30 and the input shaft of the transmission 60 via the transmitting member 32, as described above. The inverters 41, 42 are used for driving the motors MG1, MG2, and also are connected to the battery 50 via electric power lines 54. The motors MG1, MG2 are rotationally driven by switching control of a plurality of switching devices (omitted from illustration) in the inverters 41, 42. The switching control is performed by a motor electronic control unit (hereinafter referred to as a motor ECU) 40.

The motor ECU 40 is provided with a microcomputer having a CPU, ROM, RAM, an input-output port, and a communication port. The motor ECU 40 receives input of signals from various types of sensors necessary for driving control of the motors MG1, MG2, via the input port. Examples of signals input to the motor ECU 40 include rotational positions θm1 and θm2 of the rotors of the motors MG1, MG2 from rotational position sensors 43 and 44 that detect rotational positions of the rotors of the motors MG1, MG2, phase currents Iu1, Iv1, Iu2, and Iv2 of the phases of the motors MG1, MG2, from current sensors that detect phase current flowing at the respective phases of the motors MG1, MG2. Switching control signals and so forth are output from the motor ECU 40 via the output port, to the switching devices (omitted from illustration) of the inverters 41, 42. The motor ECU 40 is connected to the HV ECU 70 via a communication port. The motor ECU 40 computes the electrical angles θe1, θe2 of the motors MG1, MG2, and revolutions Nm1, Nm2, based on the rotational positions θm1, of the rotors of the motors MG1, MG2 from the rotational position sensors 43 and 44.

The battery 50 is configured of a lithium-ion secondary battery or a nickel-metal hydride secondary battery, for example. This battery 50 is connected to the inverters 41, 42 via the electric power line 54, as mentioned earlier. The battery 50 is managed by a battery ECU 52.

The battery ECU 52 is provided with a microcomputer having a CPU, ROM, RAM, an input-output port, and a communication port. The battery ECU 52 receives input of signals from various types of sensors necessary for managing the battery via the input port. Examples of signals input to the battery ECU 52 include voltage Vb of the battery 50 from a voltage sensor (omitted from illustration) attached across the terminals of the battery 50, current Ib of the battery 50 from a current sensor (omitted from illustration) attached to the output terminal of the battery 50, and temperature Tb of the battery 50 from a temperature sensor (omitted from illustration) attached to the battery 50. The battery ECU 52 is connected to the HV ECU 70 via a communication port. The battery ECU 52 computes a state of charge (SOC) of the battery 50 based on an integrated value of the current Ib of the battery 50 from the current sensor. The state of charge (SOC) is the level of charge that the battery 50 is capable of discharging as to the full capacity of the battery 50.

The system main relay 56 is provided on the electric power line 54, connecting and disconnecting the inverters 41, 42 and the battery 50 to and from each other. The transmission 60 is configured as an automatic transmission with, for example, four speeds, six speeds, eight speeds, ten speeds, or the like, and is provided with an input shaft, an output shaft, a plurality of planetary gears, and a plurality of hydraulically-driven friction engaging elements (clutches and brakes). The input shaft of the transmission 60 is connected to the ring gear of the planetary gear 30 and the motor MG2 via the transmitting member 32, as described above. The output shaft of the transmission 60 is connected to a drive shaft 36 that is linked to drive wheels 39a, 39b via a differential gearset 38. The transmission 60 changes speeds of the power from the transmitting member 32 and transmits the power to the drive shaft 36 when a shift position SP is in a driving position (drive position or reverse position), and cuts off transmission of power between the transmitting member 32 and the drive shaft 36 when the shift position SP is in a non-driving position (park position or neutral position).

The navigation device 64 is provided with a device main unit 65, a Global Positioning System (GPS) antenna 66, and a display 67. The device main unit 65 is provided with a CPU, ROM, RAM, a storage medium (e.g., a hard disk drive (HDD) or a solid-state drive (SSD)), an input-output port, and a communication port, although omitted from illustration. The storage medium of the device main unit 65 stores map information and the like. The map information includes service information (e.g., tourism information and parking lots) and road information of traveling segments (e.g., segments between traffic lights or between intersections), stored as a database. The road information includes distance information, road width information, number-of-lanes information, regional information (urban or suburban), type information (ordinary road or highway), gradient information, legal speed limit, and number of traffic lights. The GPS antenna 66 receives information relating to the current position of the hybrid vehicle 20. The display 67 is configured as a touchscreen display that displays various types of information, such as information relating to the current location of the hybrid vehicle 20 and planned traveling route to the destination, and accepts user input of various types of instructions. The navigation device 64 is connected to the HV ECU 70 via the communication port.

Upon a destination being set by user operations of the display 67, the device main unit 65 of the navigation device 64 sets a planned traveling route from the current location of the hybrid vehicle 20 to the destination, based on the map information stored in the storage medium of the device main unit 65, the current location of the hybrid vehicle 20 from the GPS antenna 66, and the destination that has been set, displays the planned traveling route that has been set on the display 67, and performs route navigation.

The HV ECU 70 is provided with a microcomputer having a CPU, ROM, RAM, an input-output port, and a communication port. The HV ECU 70 receives input of signals from various types of sensors, via the input port. Examples of signals input to the HV ECU 70 include rotations Nd of the drive shaft 36 from a rotations sensor 36a that detects the rotations of the drive shaft 36, and the shift position SP from a shift position sensor 72 that detects the operation position of a shift lever 71. Other examples include throttle valve opening degree Acc from an accelerator pedal position sensor 74 that detects an amount of depression of an accelerator pedal 73, and a brake pedal position BP from a brake pedal position sensor 76 that detects an amount of depression of a brake pedal 75. Further examples include vehicle speed V from a vehicle speed sensor 77 and information regarding the environment around the hybrid vehicle 20 from an environment recognition device 78. Shift positions SP that are provided here include a park position (P position), a reverse position (R position), a neutral position (N position), and a drive position (D position). The environment recognition device 78 is configured of at least part of a camera, millimeter wave radar, quasi-millimeter wave radar, infrared laser radar, sonar, and so forth. Examples of information of the environment around the hybrid vehicle 20 from the environment recognition device 78 include the form of the road on which the hybrid vehicle 20 is situated (straight, curved, etc.) and distance to other vehicles in the vicinity of the hybrid vehicle 20.

The HV ECU 70 outputs control signals to the system main relay 56, control signals to the transmission 60, and so forth, via the output port. The HV ECU 70 is connected to the engine ECU 24, the motor ECU 40, the battery ECU 52, the navigation device 64, and the authentication ECU 80, via the communication port.

The authentication ECU 80 is provided with a microcomputer having a CPU, ROM, RAM, nonvolatile memory (e.g., flash memory), an input-output port, and a communication port. The authentication ECU 80 receives input of ignition signals from an ignition switch 84, and so forth, via the input port. The authentication ECU 80 is capable of wireless communication with a smart key 90 serving as a portable device, via a communication unit 81 disposed at an optional location, and a communication unit 85 that is built into the ignition switch 84 or disposed in the proximity thereof. Specifically, the authentication ECU 80 is capable of wireless communication with a smart key electronic control unit (hereinafter referred to as a key ECU) 91 for the smart key 90, via the communication unit 81, when the smart key 90 is present within a predetermined distance L1 (e.g., in the order of several tens of centimeters to several meters), outside of the hybrid vehicle 20 or inside the hybrid vehicle 20. Also, the authentication ECU 80 is capable of wireless communication with the key ECU 91 via the communication unit 85, when the smart key 90 is present within a predetermined distance L2 (e.g., either in contact or around several centimeters) from the ignition switch 84. Control signals and so forth are output from the authentication ECU 80 to a warning lamp 86 via the output port.

The smart key 90 is provided with the key ECU 91 and a communication unit 92 connected to the key ECU 91. The key ECU 91 is provided with a microcomputer having a CPU, ROM, RAM, an input-output port, and a communication port. The key ECU 91 is capable of wireless communication with the authentication ECU 80 via the communication unit 92 or the communication unit 85, as described above.

In the hybrid vehicle 20 according to the embodiment configured as described above, when the smart key 90 (a user carrying the same) enters into the predetermined distance L1 from the hybrid vehicle 20 in a state where the system of the hybrid vehicle 20 is off, the authentication ECU 80 performs authentication of the smart key 90 (authentication prior to startup of the system of the hybrid vehicle 20) by communication with the key ECU 91 of the smart key 90. When authentication of the smart key 90 is successful, the door locks are then disengaged. On the other hand, when authentication of the smart key 90 fails, the door locks remain engaged.

Now, authentication of the smart key 90 is performed as follows, for example. The authentication ECU 80 transmits a request signal via the communication unit 81. The key ECU 91 of the smart key 90 receives the request signal via the communication unit 92, and thereupon transmits an ID code (identifier) of the smart key 90 via the communication unit 92. Upon receiving the ID code via the communication unit 81, the authentication ECU 80 matches the received ID code (hereinafter referred to as "received code") against an ID code stored in the nonvolatile memory of the authentication ECU 80 (legitimate ID code of the smart key 90, hereinafter referred to as "legitimate code"). When the received code and the legitimate code agree, determination is made that authentication of the smart key 90 is successful. On the other hand, when no ID code is received within a predetermined amount of time from the transmission of the request signal, or when the received code and the legitimate code do not agree, determination is made that authentication of the smart key 90 has failed. Note that authentication of the smart key 90 may be performed over a plurality of times, taking into consideration communication problems or the like between the authentication ECU 80 and the key ECU 91.

Also, in the hybrid vehicle 20 according to the embodiment, when the user carrying the smart key 90 operates the ignition switch 84 in a state where the system of the hybrid vehicle 20 is off (when startup of the system of the hybrid vehicle 20 is instructed), the authentication ECU 80 performs authentication of the smart key 90 (authentication prior to startup of the system of the hybrid vehicle 20) by communication with the key ECU 91 of the smart key 90. When authentication of the smart key 90 is successful, the authentication ECU 80 transmits a startup permission signal to the HV ECU 70. Upon receiving the startup permission signal, the HV ECU 70 performs startup of the system of the hybrid vehicle 20, and when startup of the system is completed, transmits a startup completed signal to the authentication ECU 80. In startup of the system of the hybrid vehicle 20, the system main relay 56 is connected, for example, and thus the hybrid vehicle 20 is in a state of being capable of traveling. On the other hand, when authentication of the smart key 90 fails, the authentication ECU 80 transmits a startup forbidding signal to the HV ECU 70 and also turns on the warning lamp 86, and so forth. The HV ECU 70 that has received the startup forbidding signal does not perform startup of the system of the hybrid vehicle 20.

Further, in the hybrid vehicle 20 according to the embodiment, after startup of the system of the hybrid vehicle 20, the engine 22, the motors MG1, MG2, and the transmission 60 are controlled such that the hybrid vehicle 20 travels based on the throttle valve opening degree Acc and vehicle speed V, under collaborative control by the HV ECU 70, the engine ECU 24, and the motor ECU 40.

Figure 2:
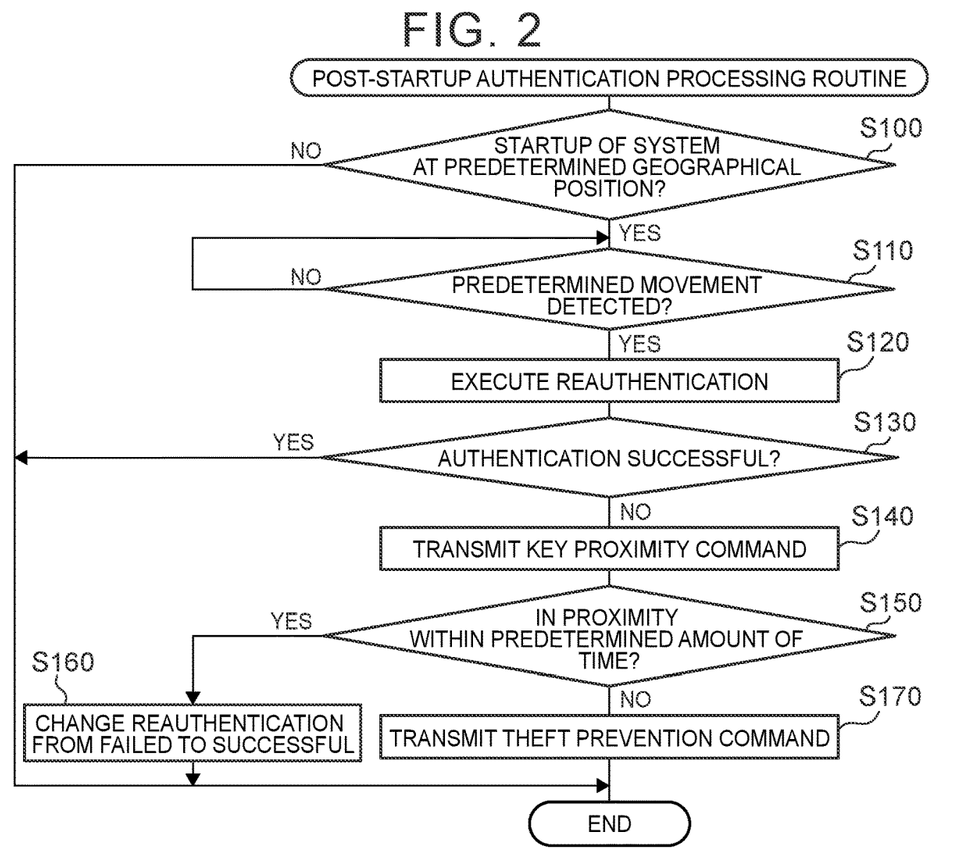
FIG. 2 is a flowchart illustrating an example of a post-startup authentication processing routine executed by an authentication ECU 80.

Next, the operations of the hybrid vehicle 20 of the embodiment, particularly operations after startup of the system of the hybrid vehicle 20, will be described. FIG. 2 is a flowchart illustrating an example of a post-startup authentication processing routine executed by the authentication ECU 80. Execution of this routine is initiated when the startup completed signal of the hybrid vehicle 20 is received from the HV ECU 70. Note that successful authentication of the smart key 90 prior to startup of the system of the hybrid vehicle 20 includes a scenario of proper authentication being performed, and a scenario of improper authentication, such as a relay attack being performed by a third party with malicious intent.

When the post-startup authentication processing routine in FIG. 2 is executed, the authentication ECU 80 first determines whether startup of the system of the hybrid vehicle 20 has been performed at a predetermined geographical position (step S100). Note that a geographical position set in advance, such as a parking space at home or at a workplace, is used for the predetermined geographical position here. The processing in step S100 is performed by determining whether the departure point of the hybrid vehicle (a geographical position where startup of the system is performed) is the predetermined geographical position, for example, by communication with the navigation device 64 via the HV ECU 70.

When the authentication ECU 80 determines that startup of the system of the hybrid vehicle 20 has been performed at a geographical position other than the predetermined geographical position in step S100, the routine ends. The reason for this lies in that improper authentication of the smart key 90 prior to startup of the system of the hybrid vehicle 20 often takes place at locations where the hybrid vehicle 20 is kept (locations where the hybrid vehicle 20 remains parked for long periods of time). This fact is taken into consideration to end the routine, so as to avoid unnecessary processing (processing of step S110 and thereafter) from being performed when startup of the system of the hybrid vehicle 20 is performed at geographical positions other than predetermined geographical positions.

When the authentication ECU 80 determines that startup of the system of the hybrid vehicle 20 has been performed at the predetermined geographical position in step S100, the flow stands by until a predetermined movement of the hybrid vehicle 20 is detected (step S110). Detection of the predetermined movement of the hybrid vehicle 20 here is performed when the authentication ECU 80 determines that the hybrid vehicle 20 has moved a predetermined distance L3 from the departure point (the geographical position where startup of the system is performed), by communication with the navigation device 64 via the HV ECU 70, for example. The predetermined distance L3 is set as a distance where, in the scenario where the authentication of the smart key 90 prior to startup of the system of the hybrid vehicle 20 is improper authentication (authentication by relay attack or the like), improper authentication cannot be performed (a distance where a relay attack or the like cannot be used). This predetermined distance L3 is in the order of around several tens of meters to several hundred meters, for example.

Upon detecting the predetermined movement of the hybrid vehicle 20 in step S110, the authentication ECU 80 performs reauthentication of the smart key 90 by communication with the key ECU 91 of the smart key 90 (authentication after startup of the system of the hybrid vehicle 20) (step S120), and determines whether the authentication is successful (step S130). The processing in step S120 is processing performed to determine whether the authentication of the smart key 90 prior to startup of the system of the hybrid vehicle 20 is proper authentication, and is performed in the same way as with the authentication of the smart key 90 prior to startup of the system of the hybrid vehicle 20. When the authentication ECU 80 determines that reauthentication of the smart key 90 is successful, the authentication ECU 80 judges that authentication of the smart key 90 prior to startup of the system of the hybrid vehicle 20 is proper authentication, and the routine ends.

When determination is made in step S130 that reauthentication of the smart key 90 has failed, the authentication ECU 80 determines that there is a possibility that authentication of the smart key 90 prior to startup of the system of the hybrid vehicle is improper authentication, and transmits a key proximity command to the navigation device 64 via the HV ECU 70 (step S140). Upon receiving the key proximity command, the navigation device 64 displays a key proximity message on the display 67 to prompt the user to bring the smart key 90 within the predetermined distance L2 from the ignition switch 84 (e.g., "Bring the smart key sufficiently close to the ignition switch."), over a predetermined amount of time T1. The predetermined amount of time T1 is, for example, in the order of around several tens of seconds to several minutes. This processing is processing for confirming that the smart key 90 is in the hybrid vehicle 20.

The authentication ECU 80 determines whether the smart key 90 has been brought into proximity of the ignition switch 84 within the predetermined distance L2 within a predetermined amount of time T2 after transmission of the key proximity command (step S150). The same amount of time as the predetermined amount of time T1 or the like is used for the predetermined amount of time T2, for example. The processing in step S150 is performed by determining whether the key ECU 91 of the smart key 90 and the authentication ECU 80 are now capable of communication via the communication unit 92 and the communication unit 85 within the predetermined amount of time T2 from transmission of the key proximity command, for example.

When determining that the smart key 90 has been brought into proximity of the ignition switch 84 within the predetermined distance L2 within the predetermined amount of time T2 from the transmission of the key proximity command in step S150, the authentication ECU 80 changes reauthentication of the smart key 90 (authentication after startup of the system of the hybrid vehicle 20) from failed to successful (step S160), and the routine ends.

When determining that the smart key 90 has not been brought into proximity of the ignition switch 84 within the predetermined distance L2 within the predetermined amount of time T2 from the transmission of the key proximity command in step S150, the authentication ECU 80 finalizes failure of reauthentication of the smart key and transmits a theft prevention command to the HV ECU 70 (step S170), and the routine ends. Upon receiving the theft prevention command, the HV ECU 70 executes the theft prevention processing routine in FIG. 3.

Figure 3:
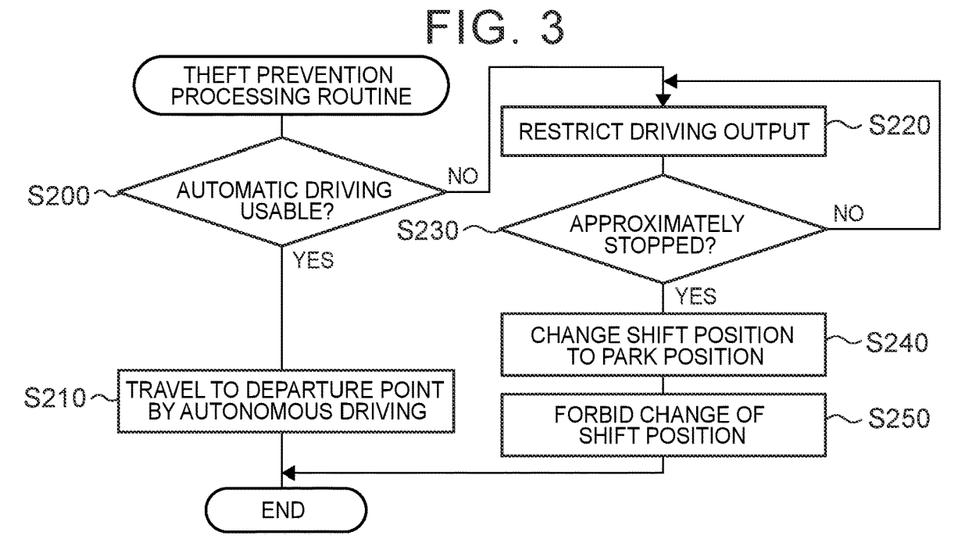
FIG. 3 is a flowchart illustrating an example of a theft prevention processing routine executed by an HV ECU 70.

When the theft prevention processing routine in FIG. 3 is executed, the HV ECU 70 determines whether autonomous driving of the hybrid vehicle 20 is usable (step S200). This processing is performed by, for example, determining whether the current location of the hybrid vehicle 20 can be confirmed by communication with the navigation device 64, determining whether information of the surroundings of the hybrid vehicle 20 can be recognized by the environment recognition device 78, determining whether information such as traffic information, traffic restriction information, and disaster information, can be received from a data center (omitted from illustration), and so forth.

When determination is made in step S200 that autonomous driving of the hybrid vehicle 20 is usable, the engine 22, the HV ECU 70 controls the motors MG1, MG2, and the transmission 60 to return the hybrid vehicle 20 to the departure point (the geographical position where startup of the system of the hybrid vehicle 20 is performed) by autonomous driving, under collaborative control by the engine ECU 24, the motor ECU 40, and the navigation device 64 (and information from the data center) (step S210), regardless of steering wheel operations and accelerator operations performed by the user, and the routine ends. Thus, returning the hybrid vehicle 20 to the departure point enables theft of the hybrid vehicle 20 to be prevented.

When determination is made in step S200 that autonomous driving of the hybrid vehicle 20 is not usable, the HV ECU 70 restricts driving output (step S220). In this processing, for example, the shift position SP is changed to the neutral position (transmission of power between the transmitting member 32 and the drive shaft 36 is cut off by the transmission 60), the driving output with regard to the throttle valve opening degree Acc is restricted (e.g., the driving output is set to a value 0 regardless of the throttle valve opening degree Acc), or the like.

Subsequently, the HV ECU 70 determines whether the hybrid vehicle 20 has come to an approximate stop (step S230). This processing is performed by comparing the vehicle speed V with a sufficiently low threshold value Vref, for example. A speed of around several km/h is used for the threshold value Vref. When the HV ECU 70 determines that the hybrid vehicle 20 has not come to an approximate stop, the flow returns to step S220.

When determining that the hybrid vehicle 20 has come to an approximate stop in step S230, the HV ECU 70 changes the shift position SP to the park position (step S240), and forbids changing of the shift position SP from the park position to any other position (step S250), and the routine ends. As described above, forbidding the hybrid vehicle 20 to travel enables theft of the hybrid vehicle 20 to be prevented. Note that an arrangement may be made where the shift position SP is changed to the neutral position, and changing from the neutral position to any other position is forbidden.

Figure 4:
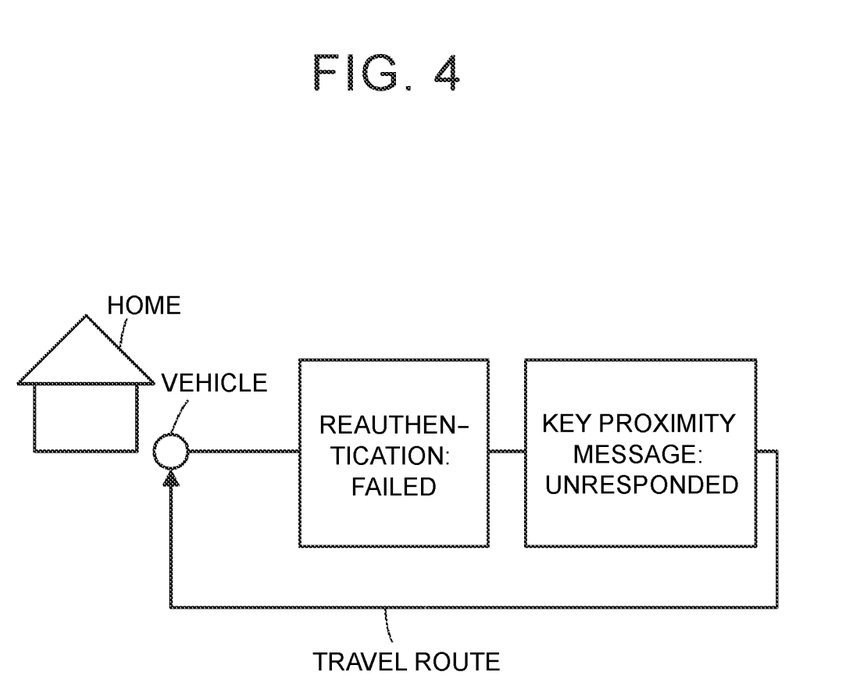
FIG. 4 is an explanatory diagram illustrating an example of a series of events following startup of a system of the hybrid vehicle 20.

FIG. 4 is an explanatory diagram illustrating an example of a series of events following startup of the system of the hybrid vehicle 20. FIG. 4 illustrates that authentication of the smart key 90 (authentication prior to startup of the system of the hybrid vehicle 20) of the hybrid vehicle 20 is successful in a parking space at home or the like, and startup of the system of the hybrid vehicle 20 is performed. Thereafter, when the hybrid vehicle 20 starts traveling and the predetermined movement of the hybrid vehicle 20 is detected, reauthentication of the smart key 90 (authentication after startup of the system of the hybrid vehicle 20) is performed. When reauthentication of the smart key 90 fails, a key proximity message is displayed on the display 67 of the navigation device 64, and when the smart key 90 is not brought into the proximity of the ignition switch 84, the hybrid vehicle 20 returns to the departure point by autonomous driving. Thus, theft of the hybrid vehicle 20 can be prevented.

In the hybrid vehicle 20 according to the embodiment described above, when the user carrying the smart key 90 operates the ignition switch 84 (instructs startup of the system of the hybrid vehicle 20), the authentication ECU 80 performs authentication of the smart key 90 (authentication prior to startup of the system of the hybrid vehicle 20), and when the authentication of the smart key 90 is successful, performs startup of the system of the hybrid vehicle 20. Upon detecting predetermined movement of the hybrid vehicle 20 after startup of the system of the hybrid vehicle 20, the authentication ECU 80 performs reauthentication of the smart key 90 (authentication after startup of the system of the hybrid vehicle 20), and when authentication of the smart key 90 fails, transmits a theft prevention command to the HV ECU 70. The HV ECU 70 that has received the theft prevention command executes theft prevention processing. The theft prevention processing includes returning the hybrid vehicle 20 to the departure point (the geographical position where startup of the system is performed) thereof by autonomous driving, restricting driving output, and changing the shift position SP to the park position when the hybrid vehicle 20 comes to an approximate stop. Such processing enables theft of the hybrid vehicle 20 to be prevented in a more reliable manner.

Description has been made regarding the hybrid vehicle 20 according to the embodiment that when the user carrying the smart key 90 operates the ignition switch 84 (when startup of the system of the hybrid vehicle 20 is instructed), the authentication ECU 80 performs authentication of the smart key 90, and when authentication of the smart key 90 is successful, startup of the system of the hybrid vehicle 20 is performed. However, an arrangement may be made where, when the smart key 90, or rather the user carrying the same, comes within the predetermined distance L1 from the hybrid vehicle 20 of which the system is off, authentication of the smart key 90 is performed. When the authentication is successful, and the user carrying the smart key 90 subsequently operates the ignition switch 84, startup of the system of the hybrid vehicle 20 is performed without performing authentication of the smart key 90 (determining that authentication of the smart key 90 has already succeeded). In this case as well, the post-startup authentication processing routine in FIG. 2 can be executed after startup of the system of the hybrid vehicle 20.

Description has been made regarding the hybrid vehicle 20 according to the embodiment that the authentication ECU 80 performs reauthentication of the smart key upon detecting predetermined movement of the hybrid vehicle 20 when startup of the system of the hybrid vehicle 20 is performed at the predetermined geographical position, while when startup of the system of the hybrid vehicle 20 is performed at the geographical position other than the predetermined geographical position, subsequent reauthentication of the smart key 90 is not performed. However, an arrangement may be made where reauthentication of the smart key 90 is performed upon detecting predetermined movement of the hybrid vehicle 20, even when startup of the system of the hybrid vehicle 20 is performed at the geographical position other than the predetermined geographical position.

Description has been made regarding the hybrid vehicle 20 according to the embodiment that the authentication ECU 80 detects the predetermined movement of the hybrid vehicle 20 when the hybrid vehicle 20 moves a predetermined distance L3 from the departure point (the geographical position where startup of the system of the hybrid vehicle 20 is performed) after startup of the system of the hybrid vehicle 20. However, an arrangement may be made where the predetermined movement of the hybrid vehicle 20 is detected when the vehicle speed V reaches at least a predetermined vehicle speed V1. For example, around 10 km/h to 20 km/h may be used as the predetermined vehicle speed V1 here.

Description has been made regarding the hybrid vehicle 20 according to the embodiment that when reauthentication of the smart key 90 (authentication after startup of the system of the hybrid vehicle 20) fails, the authentication ECU 80 displays a key proximity message on the display 67 of the navigation device 64. However, an arrangement may be made where the key proximity message is output as audio from a speaker (omitted from illustration), in addition to or instead of displaying on the display 67. Alternatively, annunciation of the key proximity message to the user may not be performed, in which event provision of the communication unit 85 may be omitted.

Description has been made regarding the hybrid vehicle 20 according to the embodiment that when autonomous driving of the hybrid vehicle 20 is usable, the engine 22, the motors MG1, MG2, and the transmission 60 are controlled to return the hybrid vehicle 20 to the departure point by autonomous driving, and when autonomous driving of the hybrid vehicle 20 is not usable, driving output is restricted, and when the hybrid vehicle 20 comes to an approximate stop, the shift position SP is changed to the park position, and so forth, as theft prevention processing. However, an arrangement may be made where autonomous driving is not performed regardless of whether autonomous driving of the hybrid vehicle 20 is usable, and at least one of restricting driving output and changing the shift position SP to the park position when the hybrid vehicle 20 comes to an approximate stop is performed.

Description has been made regarding the hybrid vehicle 20 according to the embodiment where the hybrid vehicle 20 returns to the departure point (the geographical position where startup of the system is performed) by autonomous driving, driving output is restricted, the shift position SP is changed to the park position when the hybrid vehicle 20 comes to an approximate stop, and so forth, as theft prevention processing. However, an arrangement may be made where other processing is performed, such as sounding a theft prevention alarm, or notifying a security contractor.

Description has been made that the hybrid vehicle 20 according to the embodiment is provided with the engine ECU 24, the motor ECU 40, the battery ECU 52, the HV ECU 70, and the authentication ECU 80. However, an arrangement may be made where at least two of these are configured as a single ECU.

Description has been made regarding the hybrid vehicle 20 according to the embodiment where the smart key 90 is used as the portable device, but the applicable embodiment is not limited to this. A smartphone, tablet terminal, or the like, may be used as the portable device.

Description has been made in the embodiment regarding the configuration of the hybrid vehicle 20 where the motor MG2 is connected to the drive shaft 36 linked to the drive wheels 39a and 39b, via the transmission 60, and the engine 22 and the motor MG1 are connected each other via the planetary gear 30. However, a hybrid vehicle may be configured where the transmission 60 is removed from the hybrid vehicle 20. A hybrid vehicle may also be configured as a so-called single-motor hybrid vehicle, where a motor is connected to a drive shaft linked to drive wheels, and an engine is connected to the motor via a clutch. Alternatively, a hybrid vehicle may be configured as a so-called series hybrid electrical vehicle, where a drive motor is connected to a drive shaft linked to drive wheels, and a generator that exchanges electric power with the drive motor is connected to an engine. Further, a configuration may be made as an electric vehicle that does not have an engine, and that travels under power from a motor alone. Conversely, a configuration may be made as an automobile that does not have a motor, and that travels under power from an engine alone. Moreover, such configurations are not limited to being a four-wheeled vehicle, and may be configured as a two-wheeled motorcycle or a motorized tricycle.

The correlation between primary elements of the embodiment and primary elements of the present disclosure described in the SUMMARY will be described. In the embodiment, the HV ECU 70, the engine ECU 24, the motor ECU 40, and the authentication ECU 80 can be regarded as the "controller".

Note that the correlation between primary elements of the embodiment and primary elements of the present disclosure described in the SUMMARY does not limit the elements of the present disclosure described in the SUMMARY, since the embodiment is an exemplification for describing a specific mode for carrying out the present disclosure described in SUMMARY. That is to say, interpretation of the present disclosure described in the SUMMARY should be made based on the description therein, and the embodiment is only a specific exemplification of the present disclosure described in the SUMMARY.

Although the mode of carrying out the present disclosure has been described using the embodiment, the applicable embodiment is in no way limited to the embodiment, and it is needless to say the present disclosure can be carried out by various modes without departing from the essence thereof.

The present disclosure is applicable to manufacturing industries of vehicles, and so forth.

What is claimed is:

1. A vehicle comprising a controller being configured to:
   perform authentication of a portable device by communication with the portable device (i) when startup of a system of the vehicle is instructed or when the system is off, and (ii) when the portable device is within a first predetermined distance from the vehicle;
   perform the startup of the system of the vehicle when the startup of the system of the vehicle is instructed, under a condition that the authentication of the portable device is successful;
   perform reauthentication of the portable device when a predetermined movement of the vehicle is detected after the startup of the system of the vehicle, and perform theft prevention processing if the reauthentication of the portable device fails;
   perform the reauthentication of the portable device if the predetermined movement of the vehicle is detected after the startup of the system of the vehicle at a predetermined geographical position, and not perform the reauthentication of the portable device after the startup of the system of the vehicle at a geographical position other than the predetermined geographical position; and
   perform an announcement to bring the portable device within a second predetermined distance from a predetermined portion of the vehicle, which is shorter than the first predetermined distance, if the reauthentication of the portable device fails, and change a failure in the reauthentication of the portable device to success if the controller detects that the portable device is within the second predetermined distance from the predetermined portion of the vehicle.

2. The vehicle according to claim 1, wherein the controller is configured to determine that the predetermined movement of the vehicle is detected when the vehicle travels a predetermined distance or a vehicle speed reaches a predetermined vehicle speed or above, after the startup of the system of the vehicle.

3. The vehicle according to claim 1, wherein the controller is configured to control, as the theft prevention processing, a drive device for driving to return to a geographical position where the startup of the system of the vehicle is performed by autonomous driving when the reauthentication of the portable device fails.

4. The vehicle according to claim 3, wherein the controller is configured to restrict, as the theft prevention processing, output of the drive device when the reauthentication of the portable device fails and autonomous driving is not usable.

5. The vehicle according to claim 3, wherein the controller is configured to change, as the theft prevention processing, a shift position to a park position when a vehicle speed is a predetermined vehicle speed or slower when the reauthentication of the portable device fails and autonomous driving is not usable.

6. The vehicle according to claim 1, wherein the controller is configured to restrict, as the theft prevention processing, output of a drive device for driving when the reauthentication of the portable device fails.

7. The vehicle according to claim 1, wherein the controller is configured to change, as the theft prevention processing, a shift position to a park position when a vehicle speed is a predetermined vehicle speed or slower when the reauthentication of the portable device fails.

* * * * *